United States Patent [19]

Turner

[11] Patent Number: 4,704,834

[45] Date of Patent: Nov. 10, 1987

[54] RAISED PANEL-STYLE DOOR

[76] Inventor: Terry A. Turner, Rte. 2, Box 424, Prineville, Oreg. 97754

[21] Appl. No.: 934,344

[22] Filed: Nov. 24, 1986

[51] Int. Cl.⁴ ........................ E04C 1/00; E04F 13/10; E06B 3/00; B32B 3/10

[52] U.S. Cl. ........................................ 52/311; 52/312; 52/455; 52/456; 52/785; 144/371; 156/299; 428/50; 428/53; 428/54

[58] Field of Search ................. 52/311, 312, 455, 456, 52/457, 785, 794; 144/371; 156/299; 428/54, 53, 50

[56] References Cited

U.S. PATENT DOCUMENTS

| | | | |
|---|---|---|---|
| Re. 6,549 | 7/1875 | Hurd | 52/785 |
| 161,965 | 4/1875 | Hurd . | |
| 269,818 | 12/1882 | Hamilton | 52/456 |
| 848,661 | 4/1907 | Kostelanitz . | |
| 933,328 | 9/1909 | Nellis . | |
| 1,126,794 | 2/1915 | Lee . | |
| 1,187,545 | 6/1916 | Olberg . | |
| 1,394,120 | 10/1921 | Rockwell | 144/371 X |
| 2,349,140 | 5/1944 | Bolen et al. | 52/312 X |
| 2,844,501 | 7/1958 | Snitker | 428/54 |
| 2,908,049 | 10/1959 | Gold | 156/299 X |
| 3,305,992 | 2/1967 | Steed | 52/455 X |
| 3,452,499 | 7/1969 | Ciullo | 52/311 |
| 4,327,788 | 5/1982 | Turner . | |
| 4,539,241 | 9/1985 | Kainulainen et al. | 156/299 X |
| 4,630,420 | 12/1986 | Hagemeyer | 52/455 |

FOREIGN PATENT DOCUMENTS

| | | | |
|---|---|---|---|
| 2442330 | 6/1980 | France . | |
| 2566830 | 1/1986 | France | 52/312 |
| 23593 | 2/1931 | Netherlands | 52/456 |
| 57943 | 7/1946 | Netherlands | 52/794 |
| 140245 | 3/1920 | United Kingdom | 52/785 |
| 140876 | 4/1920 | United Kingdom | 52/455 |
| 321527 | 11/1929 | United Kingdom . | |

*Primary Examiner*—Alfred C. Perham

*Attorney, Agent, or Firm*—Kolisch, Hartwell & Dickinson

[57] ABSTRACT

A raised panel-style door and method of making same are described. The structure includes a solid core having a planar veneer support surface regularly interrupted by channels extending in a rectangular course. The channels are inlaid with picture frames formed of decorative wood strips having marginal edges in the plane of the veneer support surface and being recessed therebetween. When overlaid with veneer, surface regions outside the picture frames are made to look like stiles and rails, while those inside are made to look like panels. The door may also have an internal fire-retardant layer.

11 Claims, 8 Drawing Figures

RAISED PANEL-STYLE DOOR

BACKGROUND AND SUMMARY OF THE INVENTION

This invention relates to a raised panel-style door. More particularly, this invention concerns such a door which has a continuous core extending therewithin which serves to strengthen the door and impart other characteristics such as improved resistance to break-in, improved fire-resistance, lessened sound transmission through the door, and increased durability over conventional doors.

A conventional panel door comprises stiles and rails extending vertically and horizontally in the door. The rectangular spaces within the perimeter of these stiles and rails are filled by panels with tapered, marginal edges seating in grooves presented by the stiles and rails. The panel door is typically made of decorative wood and is widely acclaimed for its aesthetic qualities.

While a conventional door has a pleasing appearance, because of its material content and structure, the door suffers durability, security, and safety problems that detract from its utility. Under the stress of normal use and the passage of time, the stiles and rails tend to sag, warp, split, and separate from each other with loosening of the panels which they encompass. The panels are relatively easily broken out for the purpose of breaking through the door. The door provides an inadequate barrier to the transmission of sound, and offers little resistance to fire. Furthermore, the construction of the door is such that it is difficult to produce with a veneer overlay covering less expensive construction material within the interior of the door.

It is desirable that a door be provided which, while overcoming the durability, security, privacy, and safety problems of the usual panel construction, preserves the aesthetic quality thereof Accordingly, it is an object of this invention to provide an improved panel-style door which features a continuous core forming the interior of the door.

Another object is to provide a door of a panel-style which lends itself to being made with a veneer overlay extending over the exterior of the door.

A further object is to provide a door with improved fire-retardant or fire-resistant properties.

And yet another object of the invention is to provide a panel-style door having greater durability than the conventional panel door.

These and other objects and advantages of the invention will be more readily apparent from the following description and taking into consideration the accompanying drawings.

DETAILED DESCRIPTION OF THE DRAWINGS

Figure 1:
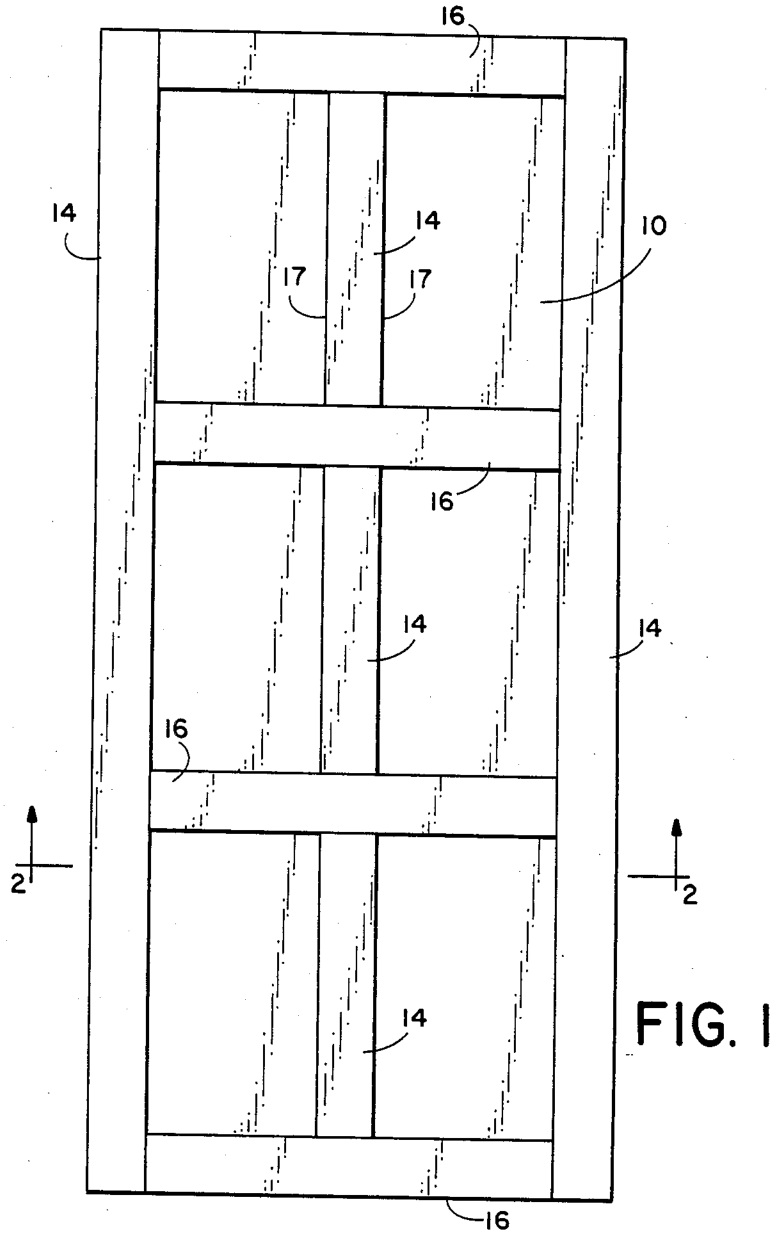
FIG. 1 is a front elevation showing a rectangular core with stile- and rail-simulating strips adhered over a face, this being a subassembly in the manufacture of the door as contemplated.

Referring now to the drawings, a raised panel-style door constructed according to the invention is illustrated in various stages of completion.

Figure 2:
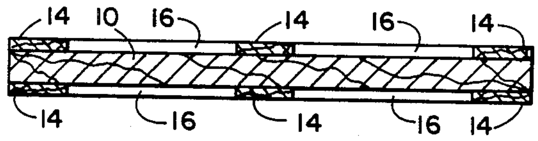
FIG. 2 is a cross section taken generally along the line 2—2 in FIG. 1.

Referring to FIGS. 1 and 2, according to one embodiment of the invention, the door is built up from a core which may be a rectangular piece of plywood and is illustrated at 10 in these figures. Applied to opposite faces are stile- and rail-simulating strips, which may be strips of conventional plywood which extend along the height and across the width of core 10, and which simulate the stiles and rails of a conventional panel door. These strips are indicated at 14 (in the case of the stile-simulating strips) and at 16 (in the case of the rail-simulating strips).

The strips may be secured to the core with adhesive and staples, if desired, and may be pressed to consolidate the assembly.

It will be noted and with reference to FIG. 1 that these stile- and rail-simulating strips encompass rectangular regions 17 facing outwardly from opposite faces of the core, which regions extend in horizontal and vertical rows over the faces of the core.

Figure 3:
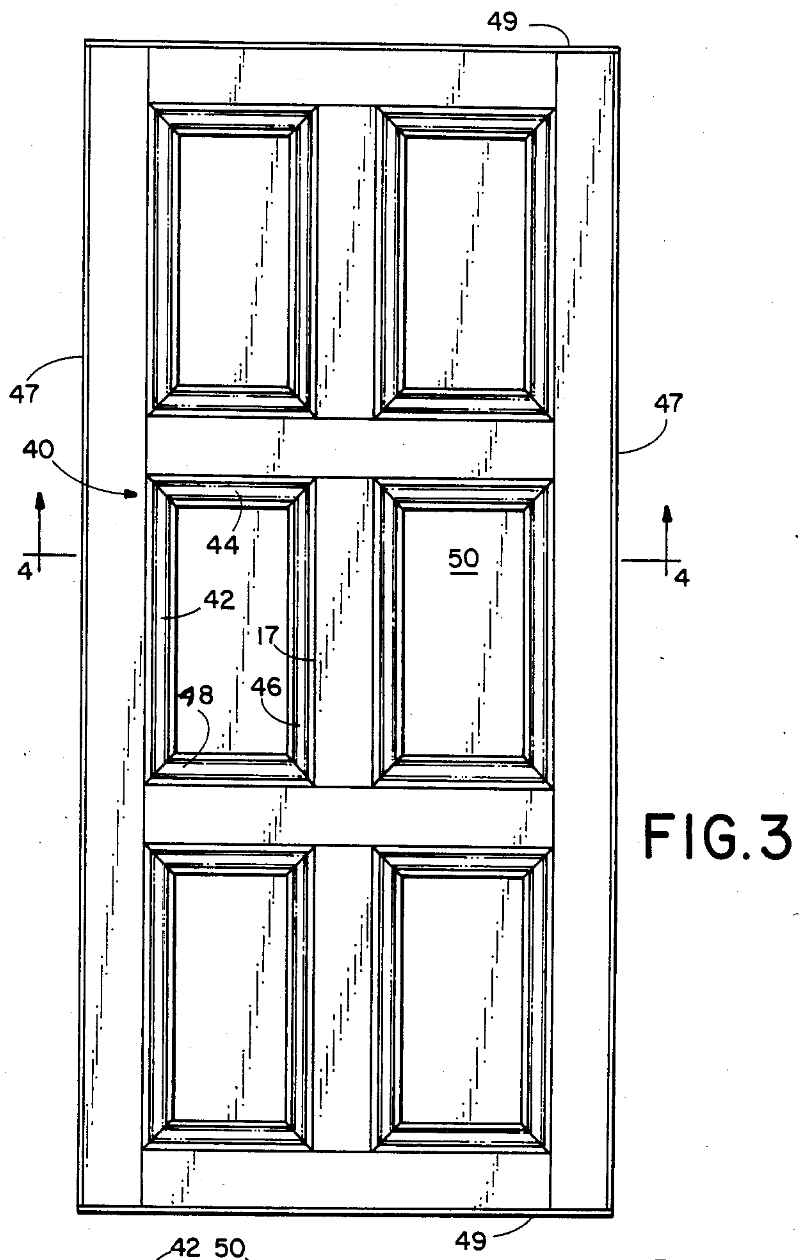
FIG. 3 is a front elevation of the subassembly shown in FIG. 1, and with the further inclusion of inlay strips forming so-called picture frames on the face of the assembly, panel-simulating pieces, and edge veneer strips adhered to the perimeter of the assembly.
Figure 4:
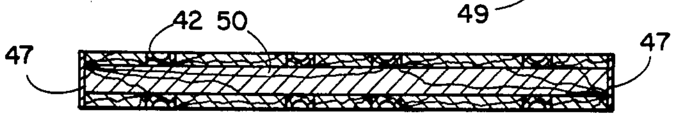
FIG. 4 is a cross-sectional view taken along the line 4—4 in FIG. 3.

As the next stage in the manufacture of a door (referring to FIG. 3), inlay strips, identified at 42, 44, 46, and 48, are added to each of the regions 17 described to form what are referred to herein as picture frames occupying the perimeter of each region. These strips which may be of decorative wood, for instance oak if the panel door is to appear as an oak door. The strips, as exemplified by strip 42 shown in FIG. 7, have opposed raised margins **42*a* and 42*b* and are recessed as at 42*c* in a region extending between these margins. The margins 42*a*, 42*b*** lie in the plane of the outer surfaces of the stile- and rail-simulating strips. The inlay strips are mitered at their ends to form the corners of the picture frame produced by the collective strips.

Figure 7:
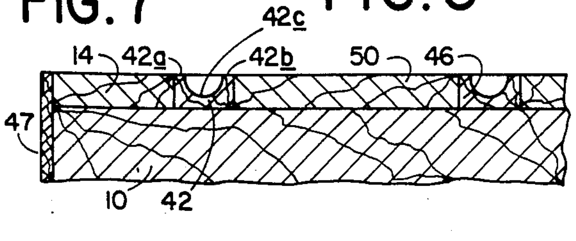
FIG. 7 is an enlargement of portions of FIG. 4.

After preparation of the picture frames, rectangular panel-simulating pieces, which may also be made of plywood, and which have substantially the thickness of the stile- and rail-simulating strips, may be placed within the rectangular spaces bounded by the respective picture frames. In FIG. 7, these panel-simulating pieces are shown in cross section at 50. These pieces, as well as the inlay strips, may be secured in place as with adhesive.

Alternatively, the panel-simulating pieces may be placed within each of the rectangular regions 17 with such centered within these regions prior to placement of the inlay strips. This method, however, requires more accurate placement of the panel-simulating pieces, to ensure that they are properly centered within the regions 17 so as to leave the desired room for placement of the inlay strips.

With placement of the stile- and rail-simulating strips and placement of the panel-simulating pieces, what is referred to herein as a support panel is formed from the core which has, over each of its opposite faces, a surface which extends in a plane.

Figure 5:
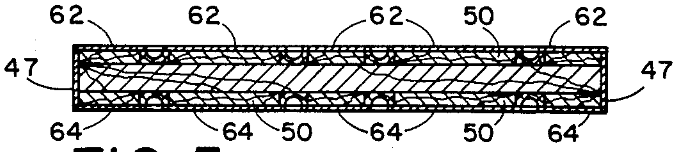
FIG. 5 is a cross-sectional view, similar to FIG. 4, but showing the door completed by the addition of overlays of veneer.

A veneer of the decorative wood is then applied over the planar surface on each side of the door formed by the stile- and rail-simulating strips and the panel-simulating pieces. This veneer overlay may also extend over the margins of the inlay strips which are also in this plane. The veneer overlay is interrupted, however, so as to leave exposed the recessed surfaces of the inlay strips. In FIG. 5, this veneer overlay is indicated in the case of one side of the door at 62, and in the case of the other side of the door at 64.

In applying this overlay, veneer pieces are used which have grain extending in the direction of the underlying stile- and rail-simulating pieces. Thus, veneer is applied to a horizontally extending rail-simulating strip which has grain extending horizontally. In the case of a vertically extending stile-simulating strip, the grain of the veneer applied thereover extends along the length, or vertically, in the door. In the usual door, the grain of the overlay for the panel-simulating pieces would extend along the length of the door, or in the same direction as the grain of the veneer pieces which cover the stile-simulating strip. At the perimeter of the door, these overlays extend over the edges of the edge veneer strips 47, 49.

The veneer overlays are secured in place as with an adhesive. To complete the door, excess veneer is trimmed off and the faces of the veneer overlays may be sanded. If desired, an appropriate finish may then be applied. The door results is a door which has the appearance of being made of solid wood, with the particular wood being the wood from which the inlay strips and veneer overlays are prepared.

Figure 6:
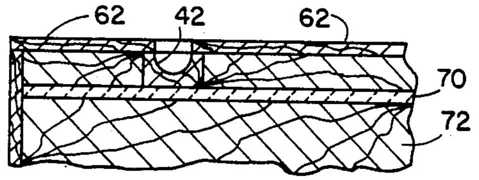
FIG. 6 is a cross-sectional view of a modified form of the invention.

Illustrated in FIG. 6 is the cross section of a door made according to a modification of the invention. In this instance, the core which is utilized in preparing the door comprises a plywood panel 72 which has applied over each of its opposite faces a sheet, such as the one shown at 70, composed of a fire-resistant or fire-retardant material. This core may be then overlaid with stile- and rail-simulating pieces, and have applied to its opposite faces the picture frames and panel-simulating pieces in the course of preparing a finished door, in the same manner as discussed in the first embodiment of the invention.

Figure 8:
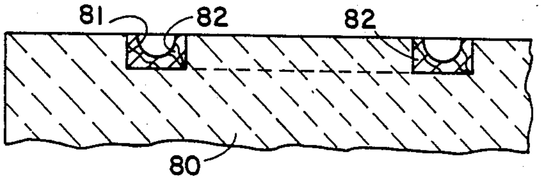
FIG. 8 is a cross-sectional view showing another modified form of the invention.

FIG. 8 illustrates yet another modification of the invention. In this instance, the core shown at 80 for the door comprises a rectangular panel formed of a non-combustible material or a fire-resistant or fire-retardant material. Multiple channels 81 are then routed out from opposite planar surfaces of the core, each channel extending in a rectangular course and conforming to the region in the door shown in FIG. 3 which receives a picture frame formed of the inlay strips. These rectangular courses are then filled with inlay strips, as exemplified by the strips shown in 82, prepared from decorative wood. Opposite margins of these inlay strips lie substantially in the plane of the surface of the core. The door is completed by applying edge veneer strips to the perimeter of the core and overlaying opposite faces with veneer while leaving exposed the recesses which extend along the inlay strips between opposites margins of the inlay strips.

A door constructed as described herein may be produces which is entirely surfaced with the decorative wood. Because of the solid core construction, there are no distinct stiles and rails connected by dowels, as in a conventional door, which tend to separate. Checking of panels bounded by stiles and rails as in a conventional door is not present. There is minimal sound and energy transmission through the door. The doors offer more resistance to break-in. Eliminated is the tendency for stiles and rails to twist and warp as in conventional doors. The doors have enhanced resistance to fire, and fire resistance properties may be increased utilizing the various modifications of the invention described herein. Very importantly, the doors have a handsome, rugged appearance which is aesthetically pleasing.

While the invention has been particularly shown and described with reference to several embodiments of the invention, it will be understood by those skilled in the art that changes in form and detail may be made therein without departing from the invention.

It is claimed and desired to secure by Letters Patent:

1. A raised panel-style door comprising:

a support panel having a planar veneer-support surface extending over one face thereof, said panel further having a plurality of channels interrupting and recessed inwardly from said surface, each channel extending in a rectangular course, decorative wood inlay strips inlaid within each channel, said strips having recessed surfaces interposing marginal planar surfaces, said marginal planar surfaces abutting and being substantially coplanar with said veneer-support surface of said panel, means adhering said strips to said panel, a veneer of decorative wood overlaying said panel surface and said marginal planar surfaces of said strips with interruption so as to leave exposed said recessed surfaces of the strips, and means adhering said veneer to said support panel.

2. The door of claim 1, wherein said channels are arranged in vertical and horizontal rows set inwardly from top, bottom, and side edges of the door.

3. The door of claim 2, wherein said veneer includes veneer pieces with grain extending horizontally disposed adjacent top and bottom edges of the door, and veneer pieces with grain extending vertically disposed adjacent side edges of the door, thereby to simulate rail and stile construction.

4. The door of claim 1, wherein the support panel is a solid core, and the channels are formed by the selective removal of material from said core.

5. A raised panel-style door comprising:

a rectangular core having a planar face extending over at least one side of the core, stile- and rail-simulating flat strips adhered to the core face extending horizontally and vertically adjacent top, bottom, and side margins of the core face and encompassing rectangular regions disposed in horizontal and vertical rows over the face of the core, a rectangular panel-simulating flat piece disposed centrally within each rectangular region and secured to the core face with inner edges of the stile- and rail-simulating strips that encompass a region and outer edges of the panel-simulating piece within the region being laterally spaced to define a channel extending in a rectangular course about the piece, said stile- and rail-simulating strips and said panel-simulating pieces having outer surfaces collectively providing a planar veneer-support surface, decorative wood inlay strips extending within and fitting within the rectangular course defined about each rectangular piece with outer margins of the inlay strips meeting smoothly with the veneer-support surface and the inlay strips having recessed inner surfaces, and a veneer of decorative wood overlying and covering said veneer-support surface and adhered to the veneer-support surface, said veneer meeting with margins of said inlay strips and being interrupted so as to leave exposed the recessed surfaces of the strips.

6. The door of claim 5, wherein said core has a fire-resistant layer extending essentially continuously through the plane of the core forming a fire barrier in the door.

7. The door of claim 5, wherein the veneer of decorative wood where such overlies a stile-simulating strip has grain extending vertically in the door, and where such overlies a rail-simulating strip has grain extending horizontally in the door.

8. A method of constructing a raised panel-style door comprising:

providing a core having a planar surface extending over one side thereof, forming a plurality of channels, each extending in a rectangular course, in the planar surface of the core, inlaying each of said channels with decorative wood inlay strips, where the strips have opposed raised margins and are recessed between such margins, and by such inlaying positioning the inlay strip margins substantially in the plane of the planar surface of the core, overlaying said core planar surface with a veneer of decorative wood, and adhering said veneer to said core.

9. A method of making a raised panel-style door comprising:

providing a rectangular core having a planar face extending over at least one side of the core, securing to the face of the door (a) vertically extending stile-simulating flat strips and horizontally extending rail-simulating flat strips with such including strips positioned along top, bottom, and side margins of the core face and additional strips extending vertically and horizontally inwardly from these marginal strips, the strips encompassing rectangular regions disposed in horizontal and vertical rows over the face of the core, (b) rectangular panel-simulating flat pieces disposed centrally within each rectangular region, and (c) decorative wood inlay strips surrounding each panel-simulating piece separating the panel-simulating piece from the stile- and rail-simulating pieces surrounding the panel-simulating piece, the surfaces of the stile- and rail-simulating strips and the panel-simulating pieces and edge margins of the inlay strips collectively providing a planar surface, and applying in covering relation over said surface a decorative wood veneer and bonding such veneer to the veneer-support surface.

10. A method of constructing a raised panel-style door comprising:

providing a rectangular core having a planar surface extending over one face thereof, forming a plurality of channels in the planar surface of the core, each channel having the general profile of a picture frame and having a pair of opposed legs paralleling top and bottom margins of the core and a pair of opposed legs paralleling opposed side margins of the core, the channels being located inwardly from top, bottom, and opposed side margins of the core and there remaining an uninterrupted core planar surface portion extending along the top margin of the core, an uninterrupted core planar surface portion extending along the bottom margin of the core and opposed uninterrupted planar surface portions extending adjacent opposite side margins of the core, inlaying each of said channels with decorative wood inlay strips, where the strips have opposed raised margins and are recessed between said margins, and by such inlaying, positioning the inlay strip margins substantially in the plane of the planar surface of the core, and overlaying said core planar surface with a veneer of decorative wood and adhering said veneer to said core, said veneer along the top margin of the core and along the bottom margin of the core extending horizontally thereby to simulate the rail members in the door and said veneer along opposed side margins of the core extending vertically thereby to simulate the opposed stile members in the door.

11. A raised panel-style door comprising:

a support panel having a planar panel surface extending over at least one face thereof, said panel further having a plurality of channels interrupting and recessed inwardly from said surface, each channel extending in a rectangular course, decorative wood inlay strips inlaid within each channel, said strips having raised outer edges extending along their lengths, and recessed surfaces interposed between their raised outer edges, and a veneer of decorative wood overlaying said panel surface and adhered to the support panel, said veneer meeting with said edges of the inlay strips and being interrupted so as to leave exposed the recessed surfaces of the inlay strips.

* * * * *